UNITED STATES PATENT OFFICE.

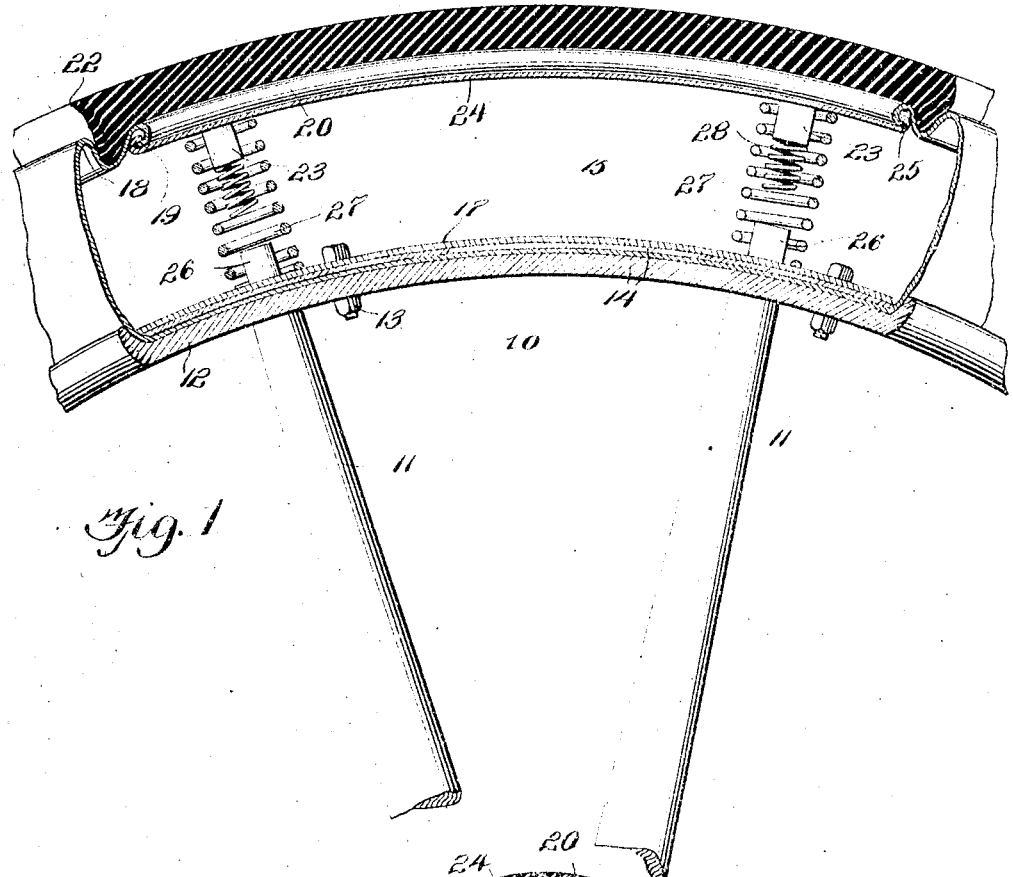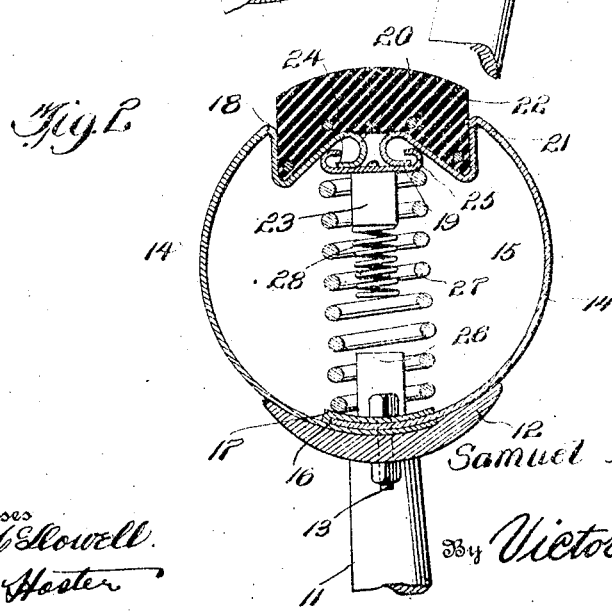

SAMUEL A. DEATHERAGE, OF RICHMOND, KENTUCKY.

TIRE.

1,020,804.  Specification of Letters Patent.  Patented Mar. 19, 1912.

Application filed March 29, 1911. Serial No. 617,709.

*To all whom it may concern:*

Be it known that I, SAMUEL A. DEATHERAGE, a citizen of the United States, residing at Richmond, in the county of Madison and State of Kentucky, have invented new and useful Improvements in Tires, of which the following is a specification.

The invention relates to resilient tires and wheels and has for an object to provide a resilient vehicle tire particularly adaptable for use on automobiles.

Among other features the invention embodies a tire adapted to overcome the usual cause of punctures and blowouts which occur in the use of pneumatic tires, and a further provision of my invention is to provide a device which will be efficient and durable in construction and which will substantially perform the functions of a pneumatic tire.

For the purpose mentioned, use is made of a plurality of sections having their ends connected and constituting a tubular casing, the said sections being adapted to be attached to the felly of a vehicle wheel and with the outer portions of the sections constituting a peripherally extending indented groove adapted to receive therein a tread and springs disposed in the said casing between the ends of the connected sections to provide a substantial resiliency, the said sections being made of a flexible material, preferably metal.

Reference is to be had to the accompanying drawings constituting a part of this specification, in which similar characters of reference denote corresponding parts in all the views, and in which—

Figure 1 is a side elevation of a portion of a wheel having my tire attached thereto, parts being broken away to disclose the underlying structure. Fig. 2 is a transverse vertical sectional view of the structure shown in Fig. 1.

Referring more particularly to the views I provide a vehicle wheel 10 having spokes 11 and a felly 12 and connected to the felly 12 by means of suitable bolts 13 are flexible sections 14 constituting a tubular casing 15, the inner ends 16 of the sections 14 at the point of connection to the felly 12, being disposed to overlap and having a plate 17 positioned at the point of overlapping so that the bolts 13 will pass through the plate 17 and the ends 16 to engage the felly 12.

The outer ends of the sections 14 are bent inwardly to form rounded portions 18 and the extremities 19 of the sections 14 are bent to form curved flanges 20, the mentioned bending of the sections 14 constituting a peripherally extending groove 21 adapted to receive therein a tread 22 having its outer surface extended beyond the rounded portions 18, the said tread 22 having a shape similar to the bent portions of the sections 14 and being secured thereto in any suitable manner.

Bumpers 23 are secured to a band 24, in the casing 15, the said band having its outer edges bent inwardly to form curved flanges 25 adapted to receive the outer ends 19 of the sections 14 as will be readily seen by referring to Fig. 2. A second bumper 26 is secured in the casing 15 adjacent the plate 17 juxtaposed to the inner ends 16 of the sections 14, the said bumper 26 extending upwardly in the casing 15 and being disposed in alinement with the bumper 23. An expansible spring 27 is disposed in the casing and has its ends encircling the bumpers 23 and 26, the ends of the said spring being also adapted to abut against the plate 17 and plate 24 so that any compressive force exerted on the tread 22 will be substantially absorbed by the spring 27 and the flexible sections 14. To provide against any undue shock exerted on the tread 22 I have secured to the bumper a spring 28, the said spring having its outer end free so that when the tread is pressed inwardly, thus bending the sections 14, the free end of the spring 28 will engage the bumper 26 to absorb the shock of the force exerted on the tread 22, it being readily seen by referring to Fig. 2 that the spring 28 will be positioned within the spring 27.

From the foregoing description it will be seen that an efficient and durable tire is provided and although I have shown a particular construction for the purpose of describing my device, it will be understood that the scope of the invention is defined in the appended claim.

Having thus fully described the invention, what I claim as new, is:—

A tire comprising a plurality of sections having overlapping ends connected to the felly of a wheel, the said sections being bent to form a peripherally extending groove and terminating in diverging flanges, a tread for attachment to the said sections and positioned in the said groove, a band mounted to engage the said diverging flanges, a bumper secured to the said band, a second bumper secured adjacent the overlapping ends of the said sections, a spring having its ends encircling the said bumpers and a second spring secured to the first mentioned bumper and extended therefrom with the free end thereof in engagement with the said second mentioned bumper.

In testimony whereof I affix my signature in presence of two witnesses.

SAMUEL A. DEATHERAGE.

Witnesses:
D. TEVIS HUGUELY,
J. W. MAUPIN.